United States Patent
Nyman et al.

(10) Patent No.: US 7,517,461 B2
(45) Date of Patent: Apr. 14, 2009

(54) METHOD AND EQUIPMENT TO CONTROL SEPARATION OF A DISPERSION LIQUID-LIQUID EXTRACTION

(75) Inventors: Bror Nyman, Ruispolku 1 (FI);
Stig-Erik Hultholm, Sitomantie 1 (FI);
Eero Ekman, Itälinjakatu (FI); Launo Lilja, Liisankatu (FI); Juhani Lyyra, Kalastajankuja (FI); Pertti Pekkala, Veistotie (FI); Raimo Kuusisto, Kalastajankuja (FI)

(73) Assignee: Outotec Oyj, Espoo (FI)

( * ) Notice: Subject to any disclaimer, the term of this patent is extended or adjusted under 35 U.S.C. 154(b) by 584 days.

(21) Appl. No.: 10/514,984

(22) PCT Filed: May 15, 2003

(86) PCT No.: PCT/FI03/00376

§ 371 (c)(1),
(2), (4) Date: Nov. 16, 2004

(87) PCT Pub. No.: WO03/097205

PCT Pub. Date: Nov. 27, 2003

(65) Prior Publication Data

US 2005/0161524 A1    Jul. 28, 2005

(30) Foreign Application Priority Data

May 16, 2002  (FI) ................................. 20020924

(51) Int. Cl.
*B01D 11/04* (2006.01)

(52) U.S. Cl. .................. 210/802; 210/522; 210/800; 210/801; 210/521; 210/634

(58) Field of Classification Search .................. 210/634, 210/800, 801, 802, 522, 521; 423/24, 8, 423/139, 99
See application file for complete search history.

(56) References Cited

U.S. PATENT DOCUMENTS

| | | | |
|---|---|---|---|
| 3,899,299 A | 8/1975 | Bushnell et al. | 23/270.5 |
| 3,989,467 A | 11/1976 | Paige | 23/267 |
| 4,469,582 A | 9/1984 | Sublette et al. | |
| 4,581,120 A * | 4/1986 | Sublette | 204/666 |
| 4,747,948 A | 5/1988 | North | |
| 5,865,992 A * | 2/1999 | Edmondson | 210/180 |
| 6,132,615 A * | 10/2000 | Nyman et al. | 210/634 |

FOREIGN PATENT DOCUMENTS

AU     74258/94     12/1997

* cited by examiner

*Primary Examiner*—Wayne Langel
*Assistant Examiner*—James Fiorito
(74) *Attorney, Agent, or Firm*—Locke Lord Bissell & Liddell LLP

(57) ABSTRACT

The invention relates to a method for the controlled separation of a dispersion of two liquids formed in the mixing stage of liquid-liquid extraction into their own phases in the separation section of the extraction. In particular the method and equipment relate to the extraction process used in the recovery of metals. In accordance with the method the dispersion band remaining between the separated phases is dammed up using at least one revert member for said purpose located in the separation section. The equipment according to the invention comprises at least one revert member, which is in turn made up of at least two separate parts.

24 Claims, 2 Drawing Sheets

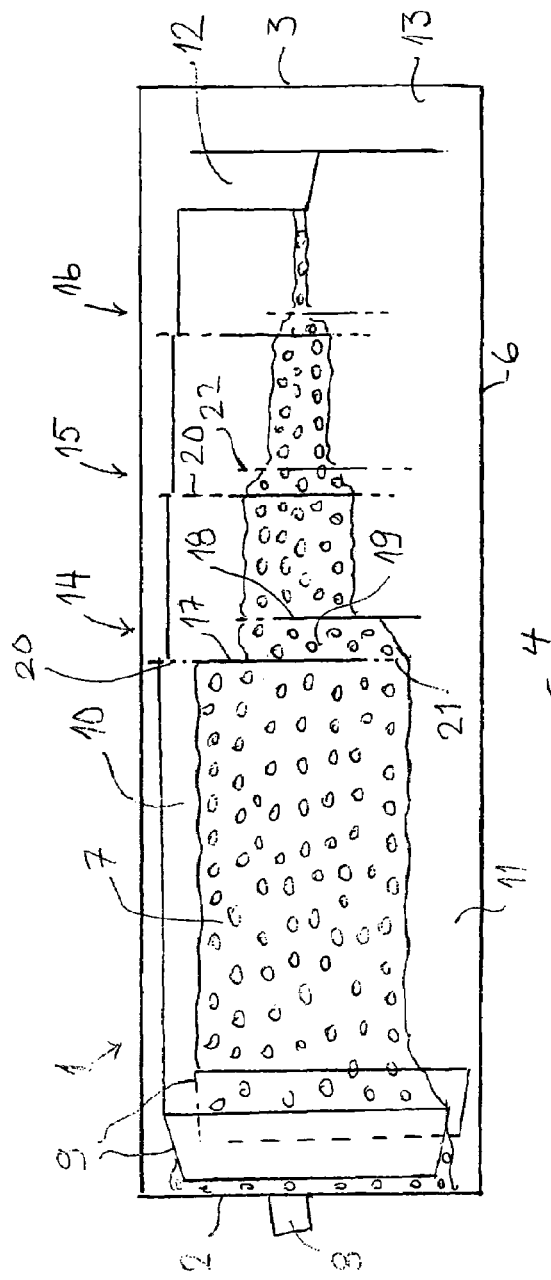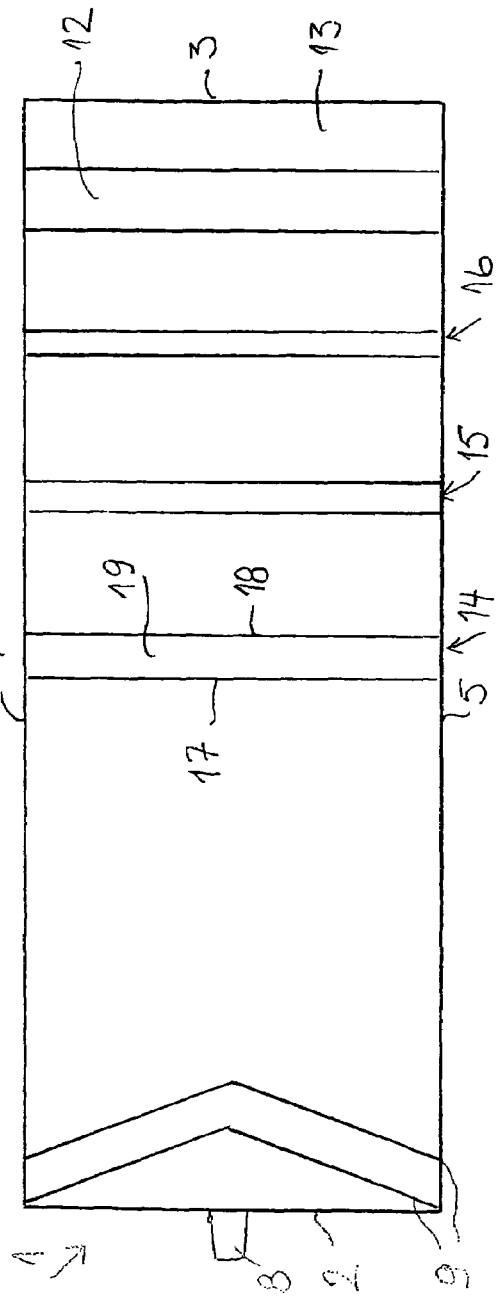

Figure 3:
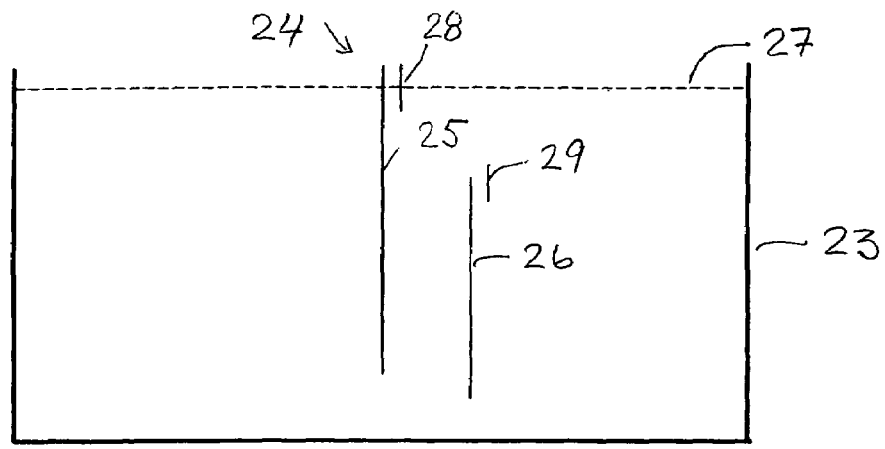

METHOD AND EQUIPMENT TO CONTROL SEPARATION OF A DISPERSION LIQUID-LIQUID EXTRACTION

The invention relates to a method for the controlled separation of a dispersion of two liquids formed in the mixing stage of liquid-liquid extraction into their own phases in a separation stage of the extraction. In particular the method and equipment relate to the extraction process used in the recovery of metals. In accordance with the method the dispersion band remaining between the separated phases is dammed up using at least one revert member for said purpose located in the separation section. The equipment in accordance with the invention consists of at least one revert member, which is in turn made up of at least two separate parts.

Liquid-liquid extraction has been used earlier in the metallurgical industry typically in the processing of solutions with a weak valuable metal content. Many large copper and uranium recovery extraction plants fall into this category. With regard to copper, however, the situation is changing, because the extraction feed solutions are becoming noticeably stronger with the pressurised concentrate leaching processes coming into operation. Likewise some cobalt and zinc extraction processes also treat strong feed solutions. Nevertheless, the size of the equipment, particularly in the case of copper, will generally remain large, also in the new pressurised leaching processes.

In all extraction processes a precious metal-containing aqueous solution is brought into contact with an organic solution in the mixing section of extraction, forming a dispersion of two solutions that are insoluble in each other. The solutions in the dispersion are separated from each other in the separation section of the extraction, where the solutions separate from each other into two layers with a dispersion band remaining between them. During the mixing stage either one or more of the valuable metals in the aqueous solution is transferred to the organic phase, from which the valuable metals are recovered by stripping the aqueous solution. Extraction is performed in an equipment, where the mixing and settling sections are either located one on top of the other (column) or in series on more or less the same level horizontally. Almost always in cases when large-scale extractions of weak solutions are concerned, such as copper extraction, the equipment is positioned in an essentially horizontal position. When we refer to extraction hereinafter, the term is used for various arrangements, but essentially equipment in the same level.

U.S. Pat. No. 6,132,615 describes a method and equipment for regulating the rate of extraction solutions in an extraction separation section. The method and equipment are based on several picket fences, of a form designated in the publication, located at the front end of the separation section. The picket fences extend across the settler to its sides. Vertically the picket fences extend up to above the liquid surface and without one exception down to the bottom of the settler. The vertical control of the aqueous solution layer has been improved so that the dispersion band is made to extend as far as the farthest end of the separation section especially when the dispersion is of a water droplet dispersion type. The dispersion and the solution phases separated from it are forced to flow through a picket fence in at least three places in the separation section in question. The picket fences are vertical slots of construction. The publication states that a strong dispersion band improves the performance values of the separation section in terms of both the quantity and purity of the separated solutions. A picket fence enables an increase of flow resistance in the settler in the range of 250-600 Pa per fence.

Now a method has been developed for the control of the different phases and dispersion streams in a liquid-liquid extraction separation section so that the phases separated from the dispersion are made to flow relatively freely along the longitudinal axis of the separation section, but the unseparated dispersion is dammed up using at least one damming revert member placed in the separation section. The revert member extends right up to the sidewalls of the separation section. The equipment in accordance with the invention comprises at least one revert member located in the settler (separation section), said revert member is formed of at least two, plate-like sections, or revert plates, which are at different heights and essentially set perpendicularly to the longitudinal axis of the settler (in the direction of the solution flow). In the area formed between the revert plates, the revert channel, the direction of the dispersion flow is almost vertical, because the dispersion is made to flow above or below each revert plate into the revert channel. Changing the direction of flow of the dispersion at least once in the separation section improves the separation of the dispersion into pure solution layers above and below the dispersion. The revert member is meant to be positioned at different stages of extraction such as both in the actual extraction and also in any washing and stripping separation sections.

The essential features of the invention will be made apparent in the attached claims.

Using the method and equipment of this invention, solutions separating from each other can be made to move forward at an even rate in both a lateral and vertical direction in conditions arranged for separation. These include the fact that the solutions are made to move forward in a plug flow manner from the front end of the separation section to the tail end. One aim of the method in the present invention is to speed up the separation of the solutions from the dispersion and to improve the final separartion efficiency of the solutions i.e. to reduce the entrainment of each solution in the other.

Another purpose of the method and equipment of the present invention is to keep the dispersion band at the front end of the separation section thick, in order to promote good droplet separation. Thus it is preferable that the thickness of the dispersion band at least in the first third of the separation section is about 75% of the height of the solution and decreases gradually until the thickness of the dispersion remaining at the tail end of the separation section is as small as possible.

It is characteristic of the method and equipment that the dispersion stream is prevented from flowing forwards directly at least once by arranging at least one revert member extending above the separation section. In order for the dispersion to move past the revert member, in the first stage it must be pressed against the first plate-like part of the revert member and under it into the revert channel, which is formed between the plate-like parts of the revert member. From the revert channel the dispersion surface is made to rise so that it is able to flow over the second plate-like part of the revert member. The number of revert members in the separation part of the extraction is at least one, but can vary for instance between 1 and 6. There are at least two plate-like parts in one revert member, but the number of said parts can also vary for instance between 2 and 6. The first plate-like part of the revert member and subsequently every second part is located essentially higher in the separation section than the second plate-like part and every other part after that.

The first plate-like part belonging to the revert member, i.e. the first revert plate, is located in the separation section at a level where its upper edge extends above the dispersion band into the organic solution phase. When the separated solutions and the dispersion band between them flow from the feed end of the separation section towards the discharge end, the dispersion band is pressed against the first revert plate. The positioning of the revert plates determines the desired thickness of the organic solution layer. The dispersion should accumulate in such quantities that because it is heavier than the separated organic solution it penetrates through the riser channel or channels between the revert plates to the next section of the separation section, where the thickness of the layer of separated solutions is greater than in the previous section. The organic and aqueous solutions that have already separated into their own phases, are able to flow freely at the revert member into the next section of the separation section, but the dispersion has to collect into a layer of sufficient thickness before it is able to access the next section of the separation section via the revert member. The dispersion moves forward only when the separation section is charged with a sufficiently large flow. The larger the settler, the larger the flow required. A dense dispersion attains an improved degree of solution separation, in other words, the amount of entrainment in each solution is decreased.

The first revert plate is mainly solid, but has vertical slots in its upper section, which ensure an even flow-through of the organic solution at the revert member along the whole length of the separation section. The first revert plate extends above the surface of the organic solution, as do the slots in its upper edge. The slots going down from the top edge of the revert plate reach a depth equivalent to a maximum of half that of the thickness of the layer of separated organic solution. The slotted zone accounts for about 5-15% of the total height of the revert plate. The lower edge of the first revert plate extends to the bottom part of the separation section, but however to such a distance from the bottom that it is within the prevailing dispersion layer. The distance of the lower edge from the bottom is greater the further away the revert member is from the feed end of the separation section. In practice, the lower edge of the first revert plate is at a distance from the bottom that is 12-50% of the total depth of solution in the separation section.

The second revert plate of the revert member is the same type as the first i.e. basically solid. The lower edge of the second revert plate is placed far lower than the lower edge of the first revert plate, but however, so that there is space for the separated aqueous solution to flow unimpeded. The distance of the lower edge of the second revert plate from the bottom depends on the location of the revert member in the separation section. The lower edge of the revert plate is higher in the separation section, the further away the revert member is from the feed end of the separation section. In practice, the lower edge of the second revert plate is at a distance from the bottom that is 5-35% of the total depth of solution in the separation section. The upper edge of the second revert plate is located below the surface of the organic solution, and the distance of the upper edge from the surface of the organic solution is greater the further away the revert member is from the feed end of the separation section. In practice, the upper edge of the second revert plate is at a distance below the surface of the solution that is 12-35% of the total solution depth in the separation section.

The even distribution of the dispersion into the riser channel and an even flow out of it is made easier if the lower end of the first revert plate of the revert member is also provided with an equivalent type of slotted zone as that on the upper end of the same revert plate. Likewise, it is preferable to furnish the top end of the second revert plate with a slotted zone and the purpose of the slots in this case too is to promote the even distribution of the dispersion into the separation section. If the revert member is composed of several revert plates, the slotted zones are located on the upper and lower edges of the corresponding plates. The height of the slotted zones on the lower edge of the first revert plate and the upper edge of the second plate is in the range of 5-15% of the height of the revert plate.

If the revert member is made up of more than two revert plates, the bottom clearance of the lower edge of the third revert plate is 0-30% larger than that of the first revert plate. The distance of the third revert plate from the surface of the organic solution is 10-30% smaller than the distance of the second plate. Both the bottom clearance and the distance from the surface of the organic solution of the fourth revert plate are 0-30% greater than that of the second revert plate.

The use of a revert member reduces the amount of organic solution entrainment in the aqueous solution, so that the entrainment content in the aqueous solution entering stripping remains less than 10 ppm, generally between 2-7 ppm. For example, in copper extraction the recovery of copper takes place by electrolysis in an electrowinning circuit. The electrolysis process cannot tolerate an organic solution, and if the solution entering electrolysis is not sufficiently pure, it must be purified for example by flotation or pressure filtration. The use of a revert member facilitates the direct routing of the solution produced in extraction to further processing without separate purification stages.

An arrangement in accordance with this invention enables the reduction of the amount of the dispersion that remains unseparated at the tail end of the separation section so that it is at most 10% of the thickness of the streams in the separation section. It is also possible using this method to regulate the thickness of the layer of organic solution. The thickness of the layer of organic solution is regulated gradually in accordance with the number of revert members used.

The method and equipment are intended particularly for the extraction of metals, where the metal to be recovered is one of the following: copper, uranium, cobalt, nickel or zinc.

The invention is described further in the attached drawings, where

Figure 4:
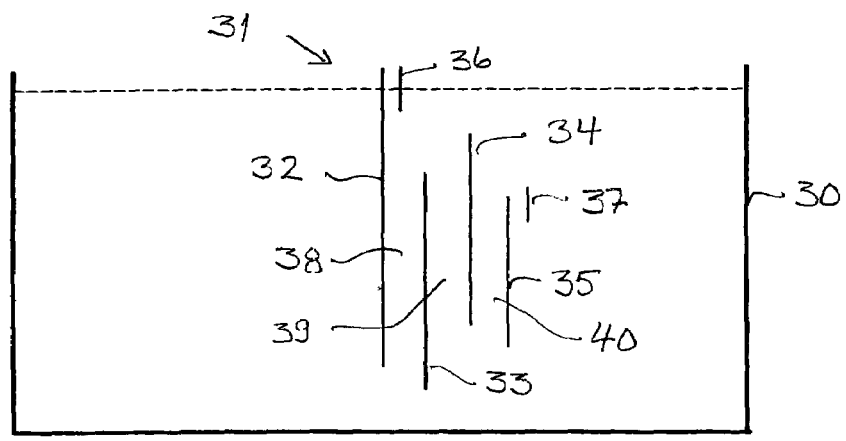
Figure 5:
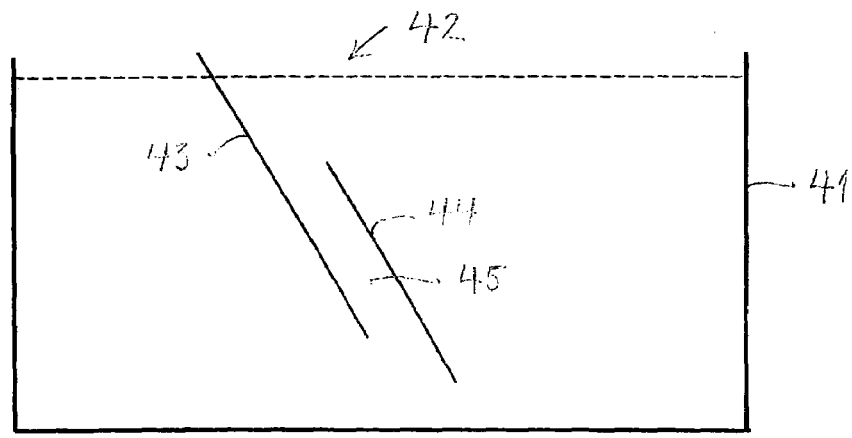

FIG. 1 is a cross-section of a liquid-liquid extraction settler in accordance with the invention, FIG. 2 is the settler in FIG. 1 as seen from above, FIGS. 3-5 show cross-sections of a settler, where a revert member is located in accordance with the invention.

FIGS. 1 and 2 show a settler 1, which is composed essentially of a vertical feed end 2, rear end 3, sidewalls 4 and 5 and bottom 6. In the mixer (not shown in the drawing), a dispersion 7 of two mixed phases is fed to the settler via the feed connection 8. In the feed end 2 of the settler there is a picket fence or other suitable directional element 9, with which the dispersion is spread across the whole width of the settler. For example the picket fences described in U.S. Pat. No. 6,132,615 with a V-shape are practicable. The drawing shows that in the front end of the settler the solutions have separated into their own phases only a little, the organic solution 10 above the dispersion 7 and the aqueous solution 11 below the dispersion. The dispersion band is dominating at the front end of the settler. The separated solutions are discharged at the rear end 3 of the settler, where there is the first organic solution launder 12 in the direction of the flow, into which the organic stream flows as the overflow and is routed onwards from there. The aqueous solution is collected in what is termed a water end 13, to which the aqueous solution flows below the organic solution launder.

In the settler shown in FIGS. 1 and 2 there are three revert members 14, 15 and 16 in accordance with the invention, of which each one is composed of two revert plates 17 and 18 and the revert channel 19 formed between them. The revert plates are located in the settler so that they lie crosswise in relation to the longitudinal axis (the direction of flow). The section of the revert plates with vertical slots is shown in the side elevation by a dotted line; the rest of the plates are solid. Thus the top 20 of the first revert plate 17 is provided with vertical slots as is the bottom 21 of the plate and the top 22 of the second revert plate. The position of the revert member in the settler can be determined as required. The further the revert member/s are from the settler feed end 2, the greater the separation capacity of the settler.

FIG. 1 shows that the distance of the revert plates from each other can also be changed so that the distance between them becomes smaller in the direction of flow. The distance between the plates is measured in such a way that the flow rate of the dispersion in the revert channel between them is of the order of 0.05-0.4 m/s. The vertical slots of the top of the first revert plate are dimensioned equally over the cross-section of the settler so that the flow rate of the organic phase flowing through them is in the range of 0.1-0.6 m/s.

The cross-section of the settler in FIG. 2 is drawn as a rectangular shape, but this embodiment of the invention is not limiting, rather the settler may be as required either square or a trapezoid that either narrows or widens towards the rear end, either narrowing or widening on both sides 4 and 5 or only on one side. When the settler is formed in the shape of a trapezoid that narrows towards the rear end, the dispersion is pressed in yet a third direction in addition to the longitudinal and upward compression.

FIG. 3 is an example of one revert member 24 placed in a settler 23, which comprises two revert plates 25 and 26. The first revert plate 25 extends above the surface 27 of the organic solution. To simplify the drawing the vertical slotted section is not shown separately. Seen in the direction of flow baffle plates 28 and 29 are located behind the top of each revert plate, formed by vertical plate strips, which are placed in between the gaps in the top of the revert plate. The height of the baffle plates can be changed. The baffle plates are in the form of a downward-facing comb, so that their upper edge is fixed. The distance of the baffle plates from the revert plate is 2-3 times the width of the revert plate slot. Vertical flow channels are formed between the strips, with a width much greater than that of the strips themselves. In this way it is possible to slow down and even out the flow entering the settler extension, which is conducive for improving the separating properties of the settler.

FIG. 4 represents a simplified settler 30, into which one revert member 31 has been placed, which in this case consists of four revert plates 32, 33, 34, and 35. Baffle plates 36 and 37 have again been placed behind the top of the first and last revert plates. In the case of this drawing the dispersion flow has to flow through three revert channels, 38, 39 and 40, wherein the flow is almost vertical, either upward or downward. Vertical flows are excellent for making solutions separate from each other.

FIG. 5 shows an example of a settler 41 with only one revert member 42, which is formed of two revert plates 43 and 44. The revert plates are now positioned at an angle rather than being upright, but the dispersion band moving forward in revert channel 45 nevertheless has in effect to rise vertically between the revert plates. Revert plates can therefore be positioned at an angle of between 50° and 90° to the horizontal. The inclination may be either towards the settler feed end as in FIG. 5 or they may be inclined towards the rear end of the settler. The inclination shown in FIG. 5 is a better alternative than the latter. It is appropriate to use inclined revert members when treating solutions that separate poorly.

Revert members in accordance with the invention can be used in the settler together with conventional picket fences, and picket fences may be located in other parts of the settler as well as the feed end.

The invention claimed is:

1. A method for the controlled separation of a dispersion formed of an aqueous solution and an organic solution into their own phases in connection with the recovery of metals in a settler present in the separation section of a liquid-liquid extraction process comprising:
   a) damming up the dispersion by means of at least one revert member, comprising at least two revert plates, wherein each revert plate abuts both sidewalls of the settler, and each revert plate is perpendicular to the longitudinal axis of the settler, wherein consecutive revert plates are situated at different heights to form a revert channel between the consecutive revert plates;
   b) causing the dispersion to flow locally in a vertical direction in the revert channel;
   c) causing the separated upper phase to flow over the revert member and/or through only the upper portion of the revert member, and causing the separated lower phase to flow under the revert member and/or through only the bottom part of the revert member; and
   d) extending the upper edge of a revert plate of the revert member into the separated upper phase, wherein the revert plate has a slotted zone comprising vertical slots along the upper edge; and causing the separated upper phase to flow partially over and through the slotted zone of the revert plate.

2. The method according to claim 1, further comprising causing the dammed dispersion to flow under the first revert plate into the first revert channel.

3. The method according claim 2, further comprising causing the dispersion that has flowed into the revert channel to flow over the last revert plate of the revert member.

4. The method according to claim 1, wherein the number of revert members located in the separation section is 1-6.

5. The method according to claim 1, wherein the number of revert plates in the at least one revert member is 2-6.

6. The method according to claim 1, wherein the metal to be recovered is selected from the group consisting of copper, uranium, cobalt, nickel and zinc.

7. Equipment for the controlled separation of a dispersion formed of an aqueous solution and an organic solution into their own phases in connection with the recovery of metals in a settler present in the separation section of a liquid-liquid extraction process, comprising: a feed end, a rear end, two sidewalls and a bottom, further comprising at least one revert member, wherein the revert member comprises at least two revert plates, wherein each revert plate abuts both sidewalls of the settler, and each revert plate is perpendicular to the longitudinal axis of the settler, wherein consecutive revert plates are situated at different heights to form a revert channel between the consecutive revert plates, and wherein the first revert plate has a slotted zone comprising vertical slots along the upper edge, wherein said slots have a length that is 5-15% of the total height of the revert plate.

8. The equipment according to claim 7, wherein the number of revert members is 1-6.

9. The equipment according to claim 7, wherein the number of revert plates in the at least one revert member is 2-6.

10. The equipment according to claim 7, wherein the upper edge of the first revert plate is located above the surface of the liquid in the settler.

11. The equipment according to claim 7, wherein the distance from the lower edge of the first revert plate to the bottom of the settler is 12-50% of the total depth of the solution in the settler.

12. The equipment according to claim 7, wherein the first and subsequently every other revert plate has a slotted zone comprising vertical slots along the lower edge, wherein said slots have a length that is 5-15% of total the height of the revert plate.

13. The equipment according to claim 7, wherein the second and subsequently every other revert plate has a slotted zone comprising vertical slots along the upper edge, wherein said slots have a length that is 5-15% of the total height of the revert plate.

14. The equipment according to claim 7, wherein the distance from the lower edge of the second revert plate to the bottom of the settler is 5-35% of the total depth of the solution in the settler.

15. The equipment according to claim 7, wherein the upper edge of the second revert plate is located below the surface of the solution, and the distance from the surface to the upper edge of the second revert plate is 12-35% of the total depth of the solution in the settler.

16. The equipment according to claim 7, wherein the revert plates are inclined at an angle of 50-90° from the horizontal either towards or away from the rear end of the settler.

17. The equipment according to claim 16, wherein the revert plates are inclined towards the feed end of the settler.

18. The equipment according to claim 16, wherein the revert plates are inclined towards the rear end of the settler.

19. The equipment according claim 7, wherein a baffle plate is located behind a slotted zone along the upper edge of the first revert plate of the revert member, as seen in the direction of the flow in the settler, wherein the baffle plate comprises vertical strips aligned with the vertical slots of the slotted zone.

20. The equipment according to claim 7, wherein a baffle plate is located behind a slotted zone along the upper edge of the last revert plate of the revert member as seen in the direction of the flow in the settler, wherein the baffle plate comprises vertical strips aligned with the vertical slots of the slotted zone.

21. The equipment according to claim 7, wherein the feed end of the settler is equipped with a picket fence.

22. The equipment according to claim 7, wherein the first revert plate is situated so that the lower edge of the second revert plate is below the lower edge of the first revert plate, and the first revert plate is situated so that the upper edge of the first revert plate is above the upper edge of the second revert plate.

23. The equipment according to claim 7, wherein the distance from the lower edge of a third revert plate to the bottom of the settler is 0-30% larger than the distance from the lower edge of the first revert plate to the bottom of the settler and wherein the distance from the upper edge of the third revert plate to the surface of the upper phase is 10-30% smaller than the distance from the upper edge of the second revert plate to the surface of the upper phase.

24. The equipment according to claim 7, wherein the distance from the lower edge of a fourth revert plate to the bottom of the settler is 0-30% larger than the distance from the lower edge of the second revert plate to the bottom of the settler and wherein the distance from the upper edge of the fourth revert plate to the surface of the upper phase is 10-30% larger than the distance from the upper edge of the second revert plate to the surface of the upper phase.

\* \* \* \* \*